United States Patent [19]

Leuenberger

[11] 3,793,959
[45] Feb. 26, 1974

[54] AUTOMOTIVE TRUCK FOR MOVING LOADS ON A MOBILE PLATFORM
[75] Inventor: Pierre Leuenberger, Nantes, France
[73] Assignee: Creusot-Loire, Paris, France
[22] Filed: Jan. 30, 1973
[21] Appl. No.: 328,088

[52] U.S. Cl.............. 104/1 R, 104/119, 104/242, 105/144, 180/79, 244/116
[51] Int. Cl............................................. B61f 13/00
[58] Field of Search.... 104/147 R, 148 R, 243, 245, 104/119, 242, 244.1, 1 R; 280/91; 180/79, 45; 105/144; 244/116

[56] References Cited
UNITED STATES PATENTS
1,068,249 7/1913 Kimelman.......................... 104/242
3,074,173 1/1963 Little.............................. 104/242 X Primary Examiner—Robert G. Sheridan
Assistant Examiner—George F. Abraham
Attorney, Agent, or Firm—Cameron, Kerkam, Sutton, Stowell & Stowell

[57] ABSTRACT

An automotive truck including a motive and orientable wheel and movable over a support surface, the truck being slidable freely at a fixed orientation relative to a beam parallel to the surface, the beam being displaceable over the surface parallel to itself by the truck.

10 Claims, 6 Drawing Figures

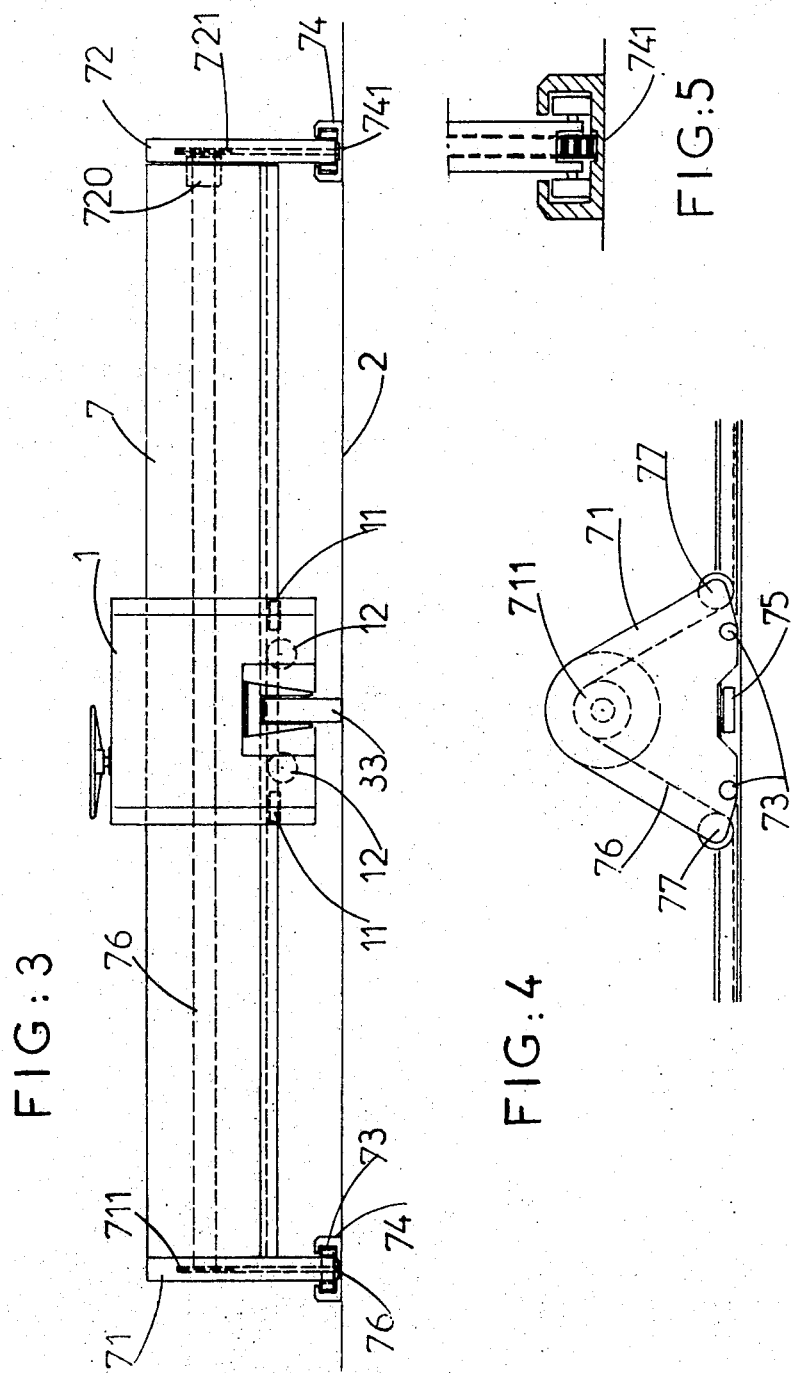

AUTOMOTIVE TRUCK FOR MOVING LOADS ON A MOBILE PLATFORM

The invention relates to an automotive truck for moving loads running on a mobile platform and more particularly for the movement of helicopters on the decks of ships.

On aircraft-carriers, aircraft and helicopters are generally moved by means of automotive trucks running freely on the deck and towing them to lifts or to parking or take-off positions.

These trucks are fairly highly manoeuvrable, but they may only be used on large vessels for which the platform movements are small, for their adherence to the deck depends not only on weight, but also on the accelerations to which they are subjected as a result of the movements of the platform. Moreover, even on large vessels, their use is limited by the state of the sea.

In these circumstances, the use of such independent automotive carriages cannot be considered on smaller vessels, which are therefore more sensitive to the state of the sea.

A movement system has therefore been devised, in particular for the movement of helicopters between the landing deck and the hangar, including two parallel rails attached to the platform, a beam transverse to the rails, provided at its ends with runners on the rails, and along which can move a mobile truck carrying a pivoting swingle-bar which can be attached to the axles of the wheels of the helicopter. The beam is driven parallel to itself by its end-runners and the mobile truck moves transversely along the beam, for example under the influence of an endless screw. The movement of the truck can be combined with that of the beam to move the helicopter obliquely of the rails. As the combination of the two movements is determined by construction, the helicopter can only be moved in certain directions and, because not any movement can be imparted to it, the introduction of the helicopter into the hangar can be fairly difficult.

Taking into account, firstly, the size of the end-runners of the beam, which are both motive and supporting, and, secondly, the energy supply system, the said end-runners have to be placed in longitudinal pits positioned under the deck. Because of this, it is practically impossible to instal such a system on old ships and it represents, in any case, a considerable undertaking, even in new ships.

The object of the invention is an automotive truck having the freedom of movement of the independent truck, but fixed to the platform so as to be usable even on small ships.

In accordance with the invention, the truck is moveable parallel to itself by free sliding along a beam parallel to the platform and bearing on the latter through at least two running supports, the said beam being subjected to simultaneous movement on the platform, parallel to itself, under the influence of the automotive truck.

In accordance with a particular feature of the invention, each running support of the beam consists of a runner comprising a frame and at least one roller mounted to pivot on the frame and running on the rail attached to the platform, the two rails being parallel, the frame of at least one of the runners being rigidly connected to the beam.

In accordance with another feature of the invention, the beam is provided at each end with a toothed pinion engaging in a rack attached to the platform, the two racks being parallel and the toothed pinions being rigidly connected to a common shaft extending along the beam.

Finally, in accordance with another, additional feature of the invention, the beam is kept at a fixed distance from the platform and the truck has an apparatus for elastic application against the platform, rigidly connected to the truck and bearing against the beam.

The invention will now be described, with reference to a particular embodiment, presented by way of example and illustrated in the attached drawings.

FIG. 3 is a frontal view of the truck and the transverse beam.

FIG. 4 is a detailed view along the line IV—IV of FIG. 2.

FIG. 5 is a detailed section of a running rail.

Figure 1:
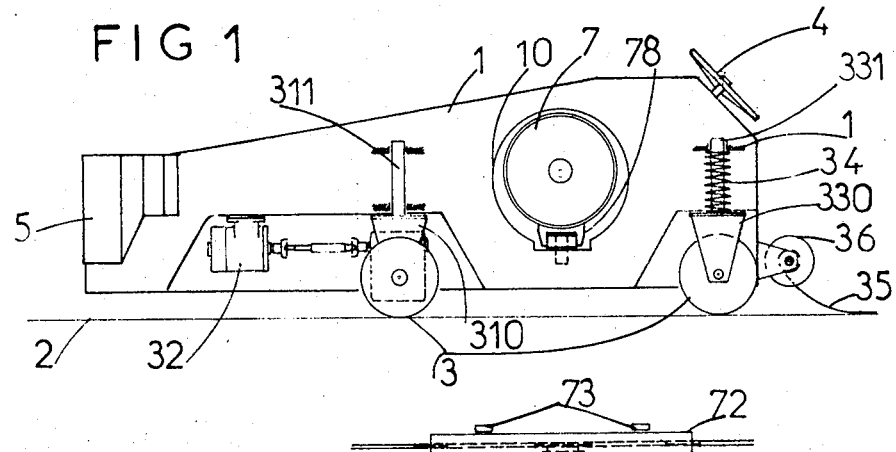
FIG. 1 is a side-elevation of the automotive truck of the invention.
Figure 2:
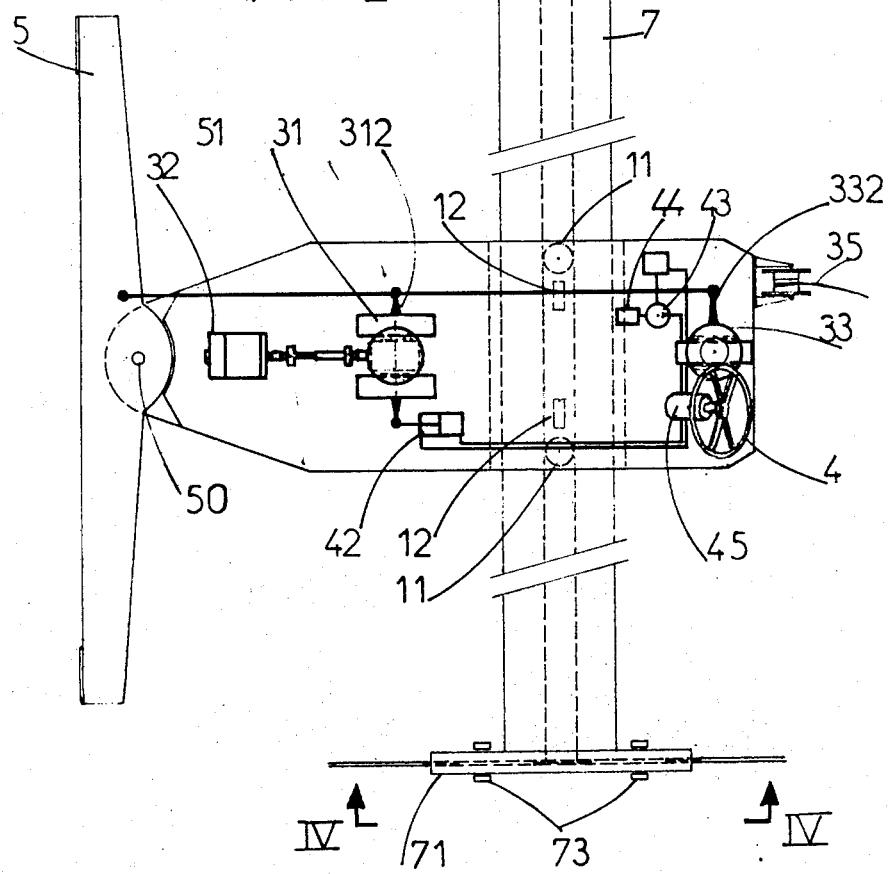
FIG. 2 is a plan of the whole system.

The truck consists of a frame 1 resting on the platform 2 by means of wheels 3, preferably fitted with pneumatic tyres for good adherence.

In the embodiment shown, wheel 3 consists of a pair of wheels 31 mounted on an axle and driven by a motor 32 through a swivel linkage, and a single wheel 33, the axles of wheels 31 and 33 being so mechanically connected that they can be simultaneously orientated by means of a steering-wheel 4, the orientation system being described below.

Truck 1 is provided at its end with a swingle-bar 5, mounted to pivot on the frame of the truck about an axis 50. In the example shown, swingle-bar 5 is able to be attached at its ends to the hubs of the wheels of the helicopter to be taken in tow.

Frame 1 of the truck is provided with an opening 10 into which passes a transverse beam 7 which may consist of a simple tube.

Beam 7 is provided at its ends with two support runners 71 and 72 each provided with running rollers 73 running on rails 74 which are parallel to each other and attached to platform 2.

Each rail 74 has the form of a U-section, the arms of which are bent inwards so that rollers 73 are held with a slight play and can keep beam 7 at a fixed distance from the platform, by running on the lower or the upper portion of the rail, no matter to what upwardly or downwardly directed strains it may be subjected.

Moreover, the frame of one of the support runners (71) is rigidly connected to beam 7, while the other support runner (72) is mounted on a pivot 720 positioned on the longitudinal axis of the beam.

Runner 71, rigidly connected to the beam, also carries a roller 75 with an axis perpendicular to the platform, which is guided between the two arms of rails 74 and maintains the transverse position of the beam.

Along this longitudinal axis of the beam extends a shaft 76, to the ends of which are attached two toothed pinions 711 and 721, positioned respectively in support runners 71 and 72 and each engaging on a sprocket-chain 76. In the embodiment shown, each chain 76 extends along a rail 74 in a cavity 741 formed in the base of this rail. On a level with the support runner, chain 76 is partially wound on toothed pinion 711 or 721, passing over return rollers 77.

Pinions 711 and 721, fixed on the same shaft, are rigidly connected for rotation and it will be seen that, in such a system, beam 7 can move freely and parallel to itself over platform 2, while remaining at a fixed distance from the said platform. However, because of the pivot mounting of one of support runners 72, the beam can, without being subject to particular strains, follow a certain warping of the platform due to the inevitable deformations of the ship.

Along beam 7 and to its lower portion is fixed a U-section (78), parallel to the longitudinal axis of the beam, inside which are engaged, with slight play, at least two rollers 11 mounted freely on frame 1 of the truck, each about an axis perpendicular to the longitudinal axis of the beam. As a result, truck 1 can slide freely along beam 7, while remaining parallel to itself.

For good adherence of the truck to the platform, whatever may be the flatness of the latter and the disturbing accelerations due to the movements of the platform, the truck is provided with an apparatus for application against the platform, bearing on beam 7, itself held, as has been seen, at a fixed distance from the platform.

In the embodiment shown, the axles of wheels 31 and 33 are each mounted on a fork 310 – 330, each of these being rigidly connected to a vertical axle 311 – 331 mounted to pivot on frame 1. The apparatus for application of the wheels against the platform will consist, for example, of an elastic organ such as a spring 34, compressed between frame 1 and the fork of one of the wheels, for example 33.

The truck bears on beam 7 by means of rollers 12, having axes parallel to the platform and running in a groove formed in the beam and which may be, for example, U-section 78. Compression of elastic organ 34 can be adjusted so as to control the adherence of the truck to the platform.

Motor 32, for driving motive wheels 31, may be a heat engine or an hydraulic, pneumatic or electric motor, supplied with energy by a flexible pipe or a cable 35 mounted on a take-up/pay-out drum 36, so that truck can move on the platform without difficulty.

Figure 6:
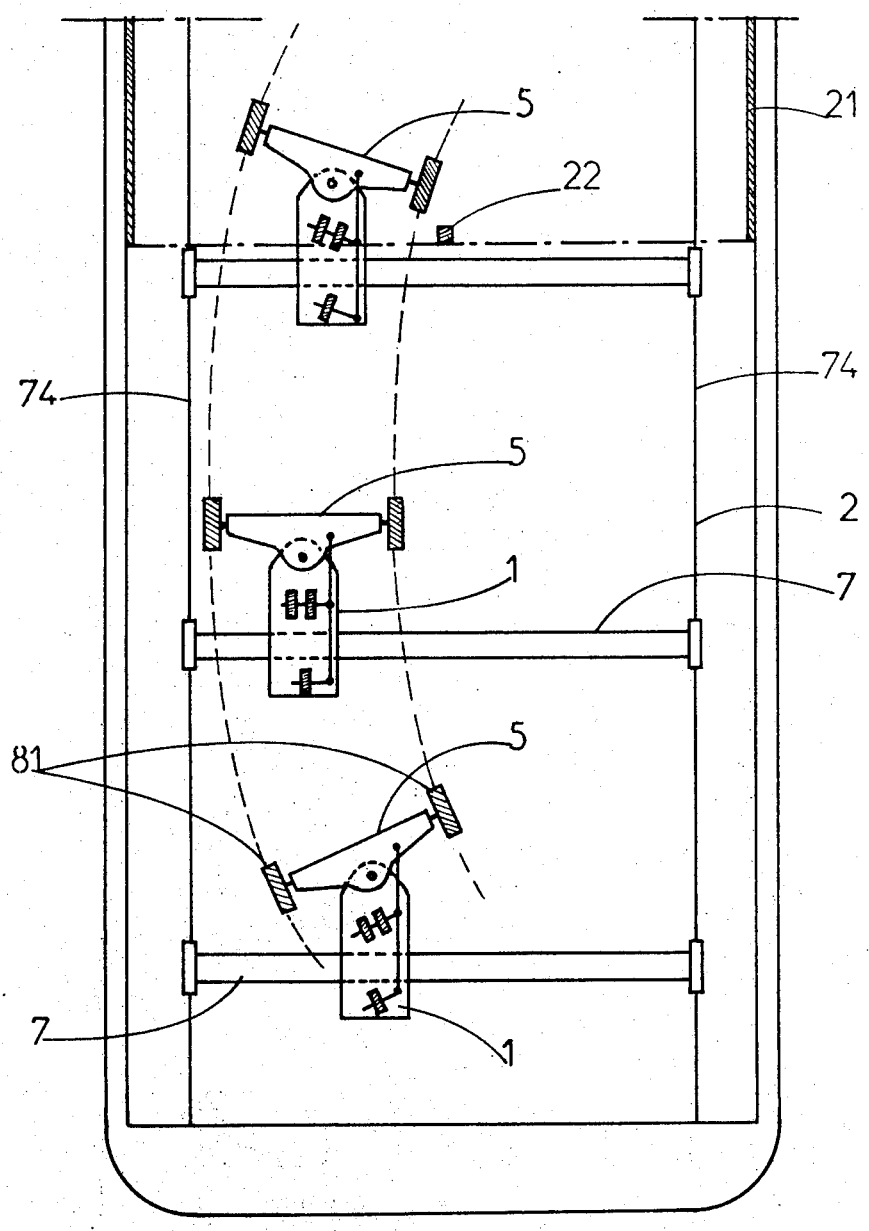
FIG. 6 is a schematic view of the whole of a helicopter landing platform showing various positions of the truck of the invention.

It will be seen that, in effect, the automotive truck will be able to move on any platform while remaining connected to the latter, these movements resolving, as shown in FIG. 6, into a sliding motion along beam 7 and a motion of the said beam parallel to itself. The relative disturbance to this movement by the friction of rollers 11 in groove 78 and of running-rollers 73 in rails 74 will be absorbed by the adherence of wheels 3 of the truck to platform 2, adjusted by means of application spring 34.

In the embodiment illustrated in the drawings, swingle-bar 5 is connected to the axles 312 and 332 of wheels 31 and 33 by means of a rod 51 forming a hinged parallellogram with the said axles 312 and 332, so that swingle-bar 5 and the axles are connected for rotation while remaining parallel to each other.

As a result, when the wheels of the truck are orientated, the wheels of the helicopter attached to swingle-bar 5 are also orientated. When the assembly moves, it may be imagined that a mechanical reduction enables not only the wheels of the truck, but also swingle-bar 5 connected to the wheels of the helicopter to be orientated by means of steering-wheel 4. However, it may be necessary to orientate the helicopter while at rest and the effort developed by steering-wheel 4 risks being insufficient. For this reason, in the embodiment shown, the axles and swingle-bar are orientated by an hydraulic system controlled by servo-assisted steering. This system, which may be of any known type, will consist for example of a double-action ram 42, the rod of which is connected to one of the axles of wheels 3, and which is supplied by a pump 43 driven by a motor 34, via a servo-hydraulic control device 45 controlled by steering-wheel 4.

The necessary power is therefore available to turn the helicopter by means of swingle-bar 5, even while at rest.

FIG. 6 shows schematically the successive manoeuvres for taking the helicopter in tow and stowing it in the hangar.

FOr the landing, truck 1 and beam 7 are placed at the end of the platform, possibly on a cantilever and at a lower level to leave the latter free.

The helicopter arrives on the landing point in any position, for example 81. In order not to over-complicate the drawing, only the wheels of the helicopter have been shown.

The truck is then brought into the hitching position, beam 7 moving along the rails under the action of the truck. It is sufficient to bring swingle-bar 5 against the axles of the wheels of the helicopter, in the axis of the latter. To facilitate this manoeuvre, the connection between the swingle-bar and the wheels may, if required, be unfastened during this operation so as to render the swingle-bar independent and more easily manageable.

When the ends of the swingle-bar have been attached to the axles of the helicopter wheels, the wheels of truck 1 are parallel to the wheels of the helicopter. The truck-driver can then drive the helicopter to its position in hangar 21, causing it to follow the required path, for example avoiding stanchion 22 which could block access to the hangar. The wheels of the helicopter and the truck faithfully follow the movements of the steering-wheel and driving of the assembly is easy, truck 1 and beam 7 moving parallel to themselves along the two perpendicular components of the motion of the helicopter.

Adherence of the truck to the platform is only slightly effected by the movements of the platform due to roll and pitch, as it is ensured by spring 34.

It will be seen that the automotive truck described above has a freedom of movement on the platform practically equal to that of a simple truck, but that it does, however, remain constantly applied to the platform, and that it cannot pivot on itself under the effect of considerable disturbances due to the motion of the platform.

It will also be noticed that the system only comprises a single motor for driving the truck, the end runners of the beam being solely of a bearing nature, since the beam moves only to follow the movements of the automotive truck.

Of course, the invention is not limited to the details of the embodiment described above, but, on the contrary, encompasses the modifications which could be devised.

Thus the truck could have only one single wheel for bearing on the platform, judiciously positioned to ensure the stability of the truck taking into account the support on the beam. This sliding support could be provided by several rows of rollers bearing on grooves in the beam parallel to its axis.

The apparatus for application of the truck to the platform could be positioned directly between the truck and the rollers for support on the beam. On the other hand, the illustrated spring could be replaced by a pneumatic or even hydraulic device if the wheels of the truck are fitted with inflated, pneumatic tyres.

On the other hand the steering system for the wheels and the swingle-bar described above could be replaced by any other equivalent electrical or mechanical system.

Finally, the system is obviously not only applicable to ships, but more generally to any mobile platform, such as a floating landing-stage or a drilling platform, for example. In addition, the truck could be adapted to move loads other than a helicopter on the platform. Thus, for example, the swingle-bar for engaging the load could be replaced by a lift platform mounted on wheels. In any case, it will be sufficient to adapt the load engaging organ to the load to be moved.

The system which has been described has the advantage of ensuring practically free movement of the load on the platform while remaining in contact with the latter and of requiring only a light, fixed apparatus. The rails are, in fact, low and can be attached to the platforms of existing ships without requiring extensive modification of the latter.

What is claimed is:

1. Automotive truck for the movement of loads on a platform, provided with at least one motive and orientatable wheel, running on the platform, and with a load engaging organ, characterised by the fact that the truck is movable parallel to itself by sliding freely along a beam parallel to the platform and bearing on the latter by means of at least two running supports, the said beam being caused to move in parallel to itself under the influence of the automotive truck.

2. Automotive truck as described in claim 1, characterised by the fact that each running support of the beam consists of a runner comprising a frame and at least one roller mounted to pivot on the frame and running on a rail attached to the platfrom, the two rails being parallel and the frame of at least one of the runners being rigidly connected to the beam.

3. Automotive truck as described in claim 1, characterised by the fact that the beam is provided at each end with a toothed pinion engaging a rack attached to the platform, the two racks being parallel and the toothed pinions being rigidly connected to a common shaft extending along the beam.

4. Automotive truck as described in claim 3, characterised by the fact that each rack consists of a sprocket-chain caused to wind partially on the corresponding toothed pinion of the beam, extending on the platform along the corresponding rail and attached to the platform at its ends.

5. Automotive truck as described in claim 4, characterised by the fact that each rail is a U-section and that the chains are each arranged inside a rail, the corresponding toothed pinion being positioned in the runner and the chain passing over the toothed pinion and over two return rollers mounted on the runner on either side of the toothed pinion.

6. Automotive truck as described in claim 1, characterised by the fact that it is provided with at least two rollers, the axes of which are in planes perpendicular to the platform, the said rollers running inside at least one groove formed along the beam and parallel to the platform.

7. Automotive truck as described in claim 1, characterised by the fact that the beam is held at a fixed distance from the platform and that the truck is provided with an apparatus for elastic application of the wheels to the platform.

8. Automotive truck as described in claim 1, characterised by the fact that there is more than one wheel and the wheels of the said truck are rigidly connected for steering, their axes being maintained parallel.

9. Automotive truck as described in claim 8, characterised by the fact that the load engaging organ is a swingle-bar mounted to pivot on the truck and parallel to the axes of the wheels of the truck, the swingle-bar and the said axes being rigidly connected for steering.

10. Automotive truck as described in claim 9, characterised by the fact that it includes a servo-apparatus for orientation of the wheels of the truck and of the swingle-bar.

* * * * *